United States Patent Office 3,497,460
Patented Feb. 24, 1970

3,497,460
METHOD OF REGENERATING CATALYSTS USED IN PREPARATION OF VINYL ESTERS
Tsutomu Ohmae, Osaka, Keizo Matsushiro, Ashiya, and Susumu Nakamura, Itami, Japan, assignors to The Nippon Synthetic Chemical Industry Co., Ltd., Osaka, Japan, a corporation of Japan
No Drawing. Filed Nov. 9, 1966, Ser. No. 592,971
Int. Cl. B01j *11/14, 11/30;* C07c *67/04*
U.S. Cl. 252—415                                                10 Claims

ABSTRACT OF THE DISCLOSURE

Catalytic suspensions containing Group VIII noble metal salts, heavy metal redox salts, and optionally, alkali metal or alkaline earth metal salts, in a liquid carboxylic acid, whose catalytic activity has been reduced, are regenerated by heating at temperatures above about 140° centigrade, preferably at about 250° to about 350° centigrade, in a closed vessel under autogenous pressure. The regeneration can be promoted by adjusting the gram atom ratio of chloride ion to redox metal ion in the suspension to a value of at least about 1.0 prior to the reactivation heating step.

---

This invention relates to a method for regenerating liquid catalyst suspension and in particular to a method for regenerating liquid catalyst suspensions employed in processes for preparing vinyl esters from ethylene.

These have been described in the prior art (for example, British Patent 966,809 published Aug. 19, 1964 and British Patent 964,001 published July 15, 1964) processes for preparing vinyl esters, such as vinyl acetate, by contacting a gaseous mixture of ethylene and oxygen with a solution or suspension of a noble metal catalyst and a heavy metal redox salt in a carboxylic acid. Optionally the solution or suspension may also contain an alkali metal or alkaline earth metal salt. The specific details of this process and the catalytic solutions or suspensions (hereinafter referred to as catalytic suspension(s), by which term is meant the carboxylic acid solution or slurry containing the noble metal salt and heavy metal redox salt, and, where desired, other optional materials) used therein are fully set forth in the aforementioned British patents, the entire disclosures of which are for purposes of simplicity and brevity incorporated herein by reference.

The catalytic suspension used in the known processes do not, per se, form a part of this invention. In summary, they contain at least one salt of a Group VIII noble metal and at least one salt of a heavy redox metal other than the said noble metals, with or without alkali metal or alkaline earth metal salts. Typical examples of suitable noble metals are palladium, rhodium, and platinum. Typical examples of suitable heavy redox metals are copper, zinc, mercury, lead, chromium, manganese, iron, nickel, cobalt, etc. The usually preferred catalyst suspension are those in which the noble metal salt is a palladium salt and the heavy metal redox salt is a copper salt. The use of salts of alkali or alkaline earth metals such as the chloride or carboxylate salts of lithium, sodium, potassium, magnesium, calcium, etc., as optional accelerators is not necessary but is desirable, because it permits a considerably increased reaction rate under moderate conditions.

The process of preparing vinyl esters, as taught by the prior art, may be generally described as follows. Ethylene and oxygen are bubbled or compressed into the catalytic suspension preferably at elevated tempeatures and pressures. In the process, the catalytic activity of the catalytic suspension tends to gradually decrease during use. According to one conventional method of regeneration, the inactive catalytic suspension is removed from the reaction zone, and then the metal salts therein are recovered, by evaporation or concentration, for reuse in the preparation of a new catalytic suspension. This method is almost always accompanied by undesirable loss of some of the salts. The loss of the valuable noble metal salt has obvious serious economic disadvantages.

It is an object of the present invention to provide a method for regenerating these known liquid catalytic suspensions without any separation steps.

It is a further object of the present invention to provide a method for regenerating these known liquid catalytic suspensions without the loss of expensive metals included therein.

Other objects of the present invention will be apparent from the following detailed description and claims.

It has been found, according to the present invention, that catalytic suspensions containing Group VIII noble metal salts, heavy metal redox salts and, optionally, an alkali metal or alkaline earth metal salt, in a liquid carboxylic acid, whose catalytic activity has been reduced, can be regenerated by heating such suspensions at a temperature of about 140° centigrade or higher, preferably about 250° to about 350° centigrade in a closed vessel under autogenous pressure for a period of time sufficient to restore the greater proportion of original catalytic activity. In a preferred embodiment the regeneration method of this invention is promoted when chloride ion is present in certain specified amounts.

Contrary to certain known regeneration methods the method of the present invention does not require the presence of an oxidizing agent such as molecular oxygen, nitric acid, organic or inorganic per-salts or the like for effective restoration of the catalytic activity of the catalyst suspensions. Of course, these materials may be used if so desired. Similarly, it is known to promote regeneration by addition of heavy metal salts, alone or together with an oxidizing agent, to the spent catalyst suspensions. In accordance with the present invention no such addition is required, but may be used if desired.

The time of regeneration will vary with such conditions as temperature, pressure, presence of chloride ions, and the like. Typically the times required, which can be readily determined by routine empirical test, will vary from about 15 minutes to several hours.

Practice of the invention is illustrated in the following examples:

Example 1

In a one liter autoclave, provided with an electromagnetic stirrer, 250 grams of glacial acetic acid, 0.75 gram of palladium chloride ($PdCl_2$), 17 grams of cupric chloride, 25 grams of cupric acetate monohydrate and 41 grams of potassium acetate were charged and heated to maintain a temperature of about 110° centigrade. Ethylene and oxygen in a molar ratio of 6 to 1 were also charged to the autoclave until the total pressure was 45 atmospheres. During the course of the reaction, additional amounts of these gases, in the same molar ratio, were charged periodically when the autoclave pressure dropped about 10 atmospheres, so as to maintain at all times approximately 35–45 atmospheres pressure.

After operating for about one hour, the autoclave contents were distilled and 103 grams of vinyl acetate and 44 grams of acetaldehyde were recovered. The distillation residue was fed back to the autoclave together with a supplementary amount of make-up acetic acid. This procedure was repeated 40 times with the same catalytic supsension, except for the addition of make-up acetic acid in each repetition. In the fortieth reaction the yields of vinyl acetate and acetaldehyde had decreased to 10 grams and 4.5 grams respectively.

The residue obtained by distillation of the autoclave contents after the fortieth reaction, to remove reaction products and by-products, was charged into an autoclave. Nitrogen was flushed through the autoclave, and then the autoclave was closed after it was placed under a nitrogen pressure of one atmosphere. The autoclave was then heated with agitation at a temperature of about 300° centigrade under autogenous pressure for two hours. The thus-treated deactivated catalytic suspension, when used in the same reaction with ethylene and oxygen as described previously, yielded 100 grams of vinyl acetate and 45 grams of acetaldehyde.

In a control run prepared in the same manner as described above, except that the temperature in the reactivation step was 140° centigrade, the yield of vinyl acetate obtained by employing the treated catalytic suspension was only 15 grams.

Examples 2 and 3

In each of these examples, the procedure as described in Example 1 was repeated with the exception that the temperature in the reactivation step was 250° centigrade and 200° centigrade, respectively. These reactivated suspensions yielded 94 grams and 45 grams of vinyl acetate respectively.

Example 4

The procedure as described in Example 1 was repeated with the exception that the deactivated catalytic suspension was treated at 250° centigrade after the autoclave had been placed under a nitrogen atmosphere of about 5 atmospheres. 95 grams of vinyl acetate was obtained by employing this reactivated catalytic suspension.

Example 5

The procedure as described in Example 1 was repeated with the exception that the amount of cupric chloride was increased to 33.6 grams and the use of potassium acetate was omitted. Under these conditions the yield of vinyl acetate decreased from 70 grams in the first reaction to 4 grams in the fortieth reaction. After reactivation of the distillation residue from the fortieth reaction, the yield of vinyl acetate again increased to 65 grams.

Examples 6–8

In each case, the procedure as described in Example 5 was repeated with the exception that one of the salts as listed in the following Table I was added to the catalytic suspension. The results are shown below.

TABLE I

| Ex. No. | Added Salt | Amounts of added salts (grams) | Yield of vinyl acetate (grams) | | |
|---|---|---|---|---|---|
| | | | In the first reaction | In the fortieth reaction | After reactivation |
| 6 | $Cr(OAc)_2 \cdot H_2O$ | 103 | 78 | 5 | 74 |
| 7 | $Ni(OAc)_2 \cdot 4H_2O$ | 97.5 | 74 | 4 | 69 |
| 8 | $Mn(OAc)_1 \cdot 4H_1O$ | 72.5 | 66 | 8 | 65 |

Examples 9–10

In these examples the procedure as described in Example 1 was repeated with the exception that 250 grams of butyric acid, or of crotonic acid, respectively, was employed in place of the acetic acid and after the twentieth reaction the distillation residue was reactivated by heating at 350° centigrade. The yields of vinyl ester in the first reaction in the twentieth reaction and in the reaction after the regeneration were 10 grams, 1 gram and 9 grams, respectively of vinyl butyrate from butyric acid; and 12 grams, 1.4 grams and 10.5 grams, respectively for vinyl crotonate from crotonic acid.

Examples 11–14

In these examples the procedure as described in Example 1 was repeated with the exception that in the regeneration step the distillation residue from the fortieth reaction was heated at 200° centigrade. In addition, there was added to the residue prior to regeneration 30.6 grams of manganese acetate tetrahydrate (Example 11), 15.3 grams of the same (Example 12), 30.7 grams of ferrous acetate tetrahydrate (Example 13), or 31.1 grams of cobalt acetate tetrahydrate (Example 14). In the reaction after the regeneration 65 grams, 60 grams, 55 grams, and 57 grams, respectively, of vinyl acetate were obtained.

Example 15

This example shows the regeneration method of this invention as applied to a continuous process for producing vinyl acetate.

A ten liter high pressure reactor was charged with a catalytic suspension preheated up to about 120° centigrade and containing 15 grams of palladous chloride, 360 grams of cupric chloride, 540 grams of cupric acetate monohydrate and 900 grams of potassium acetate in 5.4 kilograms of glacial acetic acid. A gaseous mixture at room temperature and 40 atmospheres pressure, containing 85 mole percent ethylene, 3 mole percent oxygen and 12 mole percent of inert gases, was continuously bubbled into the catalytic suspension at a rate of about 720 liters per hour. Make-up glacial acetic acid was also continuously fed to the reactor at a rate of about 4.2 kilograms per hour. Reaction products were continuously removed from the reactor in vaporized form together with the unreacted and inert gases. Normally liquid products in the exit gas stream were condensed and 2050 grams per hour of vinyl acetate and 700 grams per hour of acetaldehyde were recovered in the condensate.

During the course of this a portion of the catalytic suspension in the reactor was continuously removed from the reactor at a rate of 360 grams per hour, and was heated at a temperature of about 300° centigrade for about two hours under autogenous pressure in a closed vessel under nitrogen atmosphere using the general procedure as described in Example 1. The reactivated catalytic suspension was then recycled to the reactor. No decrease in the yield of vinyl acetate was observed over a ten day operating period under these conditions.

In a control run conducted in the same manner, with the exception that removal, treatment and recycle of a portion of the catalytic suspension was omitted, the yield of vinyl acetate and acetaldehyde decreased to 312 grams per hour and 105 grams per hour, respectively, after operation for only about 50 hours.

Examples 16–21

These examples show that when chloride ion is present, in specified amounts, in the deactivated catalytic suspension, a lower temperature may be used in the regeneration method of this invention. For such regeneration at lower temperatures, it is necessary that the gram atom ratio of chloride ion to the redox metal ion (for example, copper ion) in the suspension is at least one (1) at the time of regeneration. In practice, the gram atom ratio of chloride ion to redox metal ion may range from at least 1.0 up to about 3.0 or more. When this is the case, temperatures of between about 140° and 170° centigrade (preferably about 160° centigrade) are sufficient for the regeneration method of this invention.

Usually the gram atom ratio of chloride ion to redox metal ion in the fresh initial catalytic suspension will fall within the range of from about 0.5 to about 3.0, and is preferably about 1.0. In other words, the original catalytic suspension often contains sufficient chloride to provide the necessary gram atom ratio of chloride ion to redox metal ion. However, the amount of chloride ion in the suspension decreases through evaporation during the reaction, so that the ratio of chloride ion to redox metal ion often falls below that desired for the regeneration method. Therefore, in the preferred embodiment of this invention, it is desirable to add a chloride ion precursor (such as hydrogen chloride, sodium chloride, potassium chloride or the like) to the suspension to be regenerated. The form in which the chloride ion is added, i.e., whether as acid or salt, is not a factor in its operability in accordance with this invention. It is, of course, not necessary to add any chloride ion if enough is already present in the deactivated catalytic suspension.

To demonstrate the use of chloride ion, the general procedure of Example 1 was repeated, except that varying amounts of a 35 weight percent aqueous solution of hydrogen chloride were added to the distillation residues from the fortieth reaction before they were regenerated. There were (by calculation) approximately 0.27 gram atoms of chloride ion in the original fresh catalytic suspension. After forty reactions this had decreased to about 0.20 as determined by standard quantitative analysis procedures. The gram atom amount of copper (redox metal) ion in the original suspension and also after the fortieth reaction was 0.25. The amount of the aqueous solution of hydrogen chloride added, the resultant gram atom ratio of chloride to copper, the heating temperature and time, and the yield of vinyl acetate from thus regenerated suspensions are shown in the following Table II.

TABLE II

| Ex. | Amount of aqueous HCl solution added (Grams) | Resultant chloride to copper gram-atom ratio | Regeneration Temperature (° Centigrade) | Time (hours) | Yield (in grams) of vinyl acetate from regenerated suspension |
|---|---|---|---|---|---|
| 16 | 10.5 | 1.2 | 160 | 8 | 101 |
| 17 | 36.5 | 2.2 | 160 | 4 | 89 |
| 18 | 52 | 2.8 | 160 | 3 | 102 |
| 19 | 73 | 3.6 | 160 | 2.5 | 99 |
| 20 | 36.5 | 2.2 | 120 | 8 | 45 |
| 21 | 36.5 | 2.2 | 140 | 4 | 70 |

What is claimed is:

1. Method of regenerating catalyst suspensions containing at least one Group VIII noble metal salt and at least one salt of a heavy redox metal other than said noble metal which suspension have suffered a decrease in catalytic activity from prolonged use in the production of vinyl esters from ethylene and oxygen; said method comprising heating the deactivated catalytic suspension at a temperature of at least about 140° centigrade in a closed vessel under autogeneous pressure for a period of time sufficient to restore the greater proportion of the original catalytic activity.

2. Method of claim 1 wherein the regeneration temperature is in the range of from about 250°–350° centigrade.

3. Method of claim 2 wherein the vessel is placed under a positive pressure of an inert gas prior to closing and heating.

4. The process of claim 3, in which the inert gas is nitrogen.

5. The process of claim 4, in which the time of heating is from about 15 minutes to about 8 hours.

6. Method of claim 1 wherein the gram atom ratio of chloride ion to redox metal ion in the deactivated catalytic suspension is adjusted to a value of at least about 1.0 prior to reactivation.

7. Method of claim 6 wherein the said ratio is between 1.0 and 3.0.

8. The process of claim 7 wherein the regeneration temperature is between about 140° and about 170° centigrade.

9. Method of claim 4 wherein the Group VIII noble metal salt is palladous chloride and the heavy metal redox salt is a chloride, a carboxylate or a mixture of chloride and carboxylate of copper or iron.

10. Method of claim 8 wherein the Group VIII noble metal salt is palladous chloride and the heavy metal redox salt is a chloride, a carboxylate or a mixture of chloride and carboxylate of copper or iron.

References Cited

UNITED STATES PATENTS

| 3,134,732 | 5/1964 | Kearby | 208—140 |
| 2,956,007 | 10/1960 | Mathis | 208—140 |
| 3,288,845 | 11/1966 | Schaeffer | 260—497 |
| 3,277,158 | 10/1966 | Schaeffer | 260—497 |
| 3,346,624 | 10/1967 | Schaeffer | 260—497 |
| 3,274,238 | 9/1966 | Kojer | 260—497 |
| 3,300,528 | 1/1967 | Wakasa | 260—497 |

FOREIGN PATENTS 6,604,391  10/1966  Netherlands.

DANIEL WYMAN, Primary Examiner

P. N. FRENCH, Assistant Examiner

U.S. Cl. X.R.

252—411